United States Patent
Liu et al.

(10) Patent No.: US 12,260,468 B2
(45) Date of Patent: Mar. 25, 2025

(54) CLICKABLE ACCESS POINT

(71) Applicant: Uber Technologies, Inc., San Francisco, CA (US)

(72) Inventors: Heguang Liu, Sunnyvale, CA (US); Jane Alam Jan, Cupertino, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 18/755,359

(22) Filed: Jun. 26, 2024

(65) Prior Publication Data

US 2024/0346615 A1    Oct. 17, 2024

Related U.S. Application Data

(63) Continuation of application No. 18/049,569, filed on Oct. 25, 2022, now Pat. No. 12,051,129, which is a
(Continued)

(51) Int. Cl.
| | |
|---|---|
| *G06Q 50/40* | (2024.01) |
| *G01C 21/34* | (2006.01) |
| *G06F 3/0482* | (2013.01) |
| *G06F 3/04842* | (2022.01) |
| *G06F 3/0485* | (2022.01) |
| *G06N 20/00* | (2019.01) |

(Continued)

(52) U.S. Cl.
CPC ......... *G06Q 50/40* (2024.01); *G01C 21/3484* (2013.01); *G06F 3/0482* (2013.01); *G06F 3/04842* (2013.01); *G06F 3/0485* (2013.01); *G06N 20/00* (2019.01); *G06Q 30/0284* (2013.01); *G06Q 30/06* (2013.01); *G06Q 30/0621* (2013.01); *H04L 67/52* (2022.05); *H04L 67/60* (2022.05)

(58) Field of Classification Search
None
See application file for complete search history.

(56) References Cited

U.S. PATENT DOCUMENTS

| | | | |
|---|---|---|---|
| 9,141,995 B1 * | 9/2015 | Brinkmann | ............... G07C 5/02 |
| 11,068,959 B1 | 7/2021 | Goenka et al. | |

(Continued)

OTHER PUBLICATIONS

"U.S. Appl. No. 17/450,084, Notice of Allowance mailed Jul. 13, 2022", 8 pgs.
(Continued)

*Primary Examiner* — Ryan Barrett
(74) *Attorney, Agent, or Firm* — Schwegman Lundberg & Woessner, P.A.

(57) ABSTRACT

Systems and methods herein describe receiving a target location from a computing device, using a machine learning model: determining a first access point and a second access point associated with the target location, causing presentation of the first access point as a first selectable user interface element and the second access point as a second selectable user interface within a graphical user interface on the computing device, receiving a first selection of the first selectable user interface element from the computing device; and in response to receiving the first selection, and initiating a trip request based on the refined map coordinates of the first access point.

20 Claims, 8 Drawing Sheets

Related U.S. Application Data continuation of application No. 17/450,084, filed on Oct. 6, 2021, now Pat. No. 11,501,403.

(60) Provisional application No. 63/198,250, filed on Oct. 6, 2020.

(51) Int. Cl.
*G06Q 30/0283* (2023.01)
*G06Q 30/06* (2023.01)
*G06Q 30/0601* (2023.01)
*H04L 67/52* (2022.01)
*H04L 67/60* (2022.01)

(56) References Cited

U.S. PATENT DOCUMENTS

| | | | |
|---|---|---|---|
| 11,501,403 | B2 | 11/2022 | Liu et al. |
| 2007/0078596 | A1 | 4/2007 | Grace |
| 2008/0168369 | A1 | 7/2008 | Tadman et al. |
| 2011/0172905 | A1 | 7/2011 | Schröder et al. |
| 2012/0158289 | A1 | 6/2012 | Bernheim Brush et al. |
| 2018/0143034 | A1 | 5/2018 | Zhang et al. |
| 2020/0080857 | A1 | 3/2020 | Szubbocsev |
| 2020/0228628 | A1 | 7/2020 | Matthiesen et al. |
| 2020/0378786 | A1 | 12/2020 | Willamowski et al. |
| 2021/0004929 | A1 | 1/2021 | Sawahashi et al. |
| 2021/0118080 | A1* | 4/2021 | Ding .................. G06F 18/23213 |
| 2021/0199449 | A1 | 7/2021 | Tang et al. |
| 2021/0223059 | A1 | 7/2021 | Brush et al. |
| 2021/0364311 | A1 | 11/2021 | Baig et al. |
| 2021/0374780 | A1* | 12/2021 | Shirani-Mehr ......... G06F 16/29 |
| 2022/0020106 | A1* | 1/2022 | Albada .................. G06Q 50/40 |
| 2022/0067605 | A1* | 3/2022 | Zhang .............. G06Q 10/06311 |
| 2022/0108362 | A1 | 4/2022 | Liu et al. |
| 2022/0136839 | A1 | 5/2022 | Quint et al. |
| 2022/0205794 | A1 | 6/2022 | Friedman et al. |
| 2023/0071088 | A1 | 3/2023 | Liu et al. |

OTHER PUBLICATIONS

"U.S. Appl. No. 18/049,569, Notice of Allowance mailed Mar. 26, 2024", 15 pgs.

Dough, "Round Trip in a Lyft? How to Add Stops and do a Round Trip", [Online] Retrieved from the internet: <https://www.ridesharingdriver.com/lyft-round-trip-add-stops/>, (Oct. 1, 2019).

U.S. Appl. No. 63/198,250, filed Oct. 6, 2020, Clickable Access Point.

U.S. Appl. No. 17/450,084 U.S. Pat. No. 11,501,403, filed Oct. 6, 2021, Clickable Access Point.

U.S. Appl. No. 18/049,569, filed Oct. 25, 2022, Clickable Access Point.

\* cited by examiner

CLICKABLE ACCESS POINT

CROSS-REFERENCE TO RELATED APPLICATIONS

This application is a continuation of U.S. application Ser. No. 18/049,569, filed Oct. 25, 2022, which is a continuation of U.S. application Ser. No. 17/450,084, filed Oct. 6, 2021, which claims the benefit of priority to U.S. Provisional Application Ser. No. 63/198,250 filed Oct. 6, 2020, each of which is incorporated herein by reference in its entirety.

TECHNICAL FIELD

The subject matter disclosed herein generally relates to special-purpose machines configured to generate and provide pickup locations, and to the technologies by which such special-purpose machines become improved compared to other machines that provide pickup locations. Specifically, the present disclosure addresses systems and methods that generate and recommend clickable access points.

BACKGROUND

Transportation services typically suggest pickup and drop-off locations when a user makes a request for the transportation service. However, the suggested pickup and drop-off locations are only based on latitude and longitude coordinates of a target location. Thus, the suggestions do not account for multi-level roads or multi-entry point locations which frequently occur in complex venues such as airports or dense urban areas.

BRIEF DESCRIPTION OF THE SEVERAL VIEWS OF THE DRAWINGS

Some embodiments are illustrated by way of example and not limitation in the figures of the accompanying drawings.

DETAILED DESCRIPTION

Figure 1:
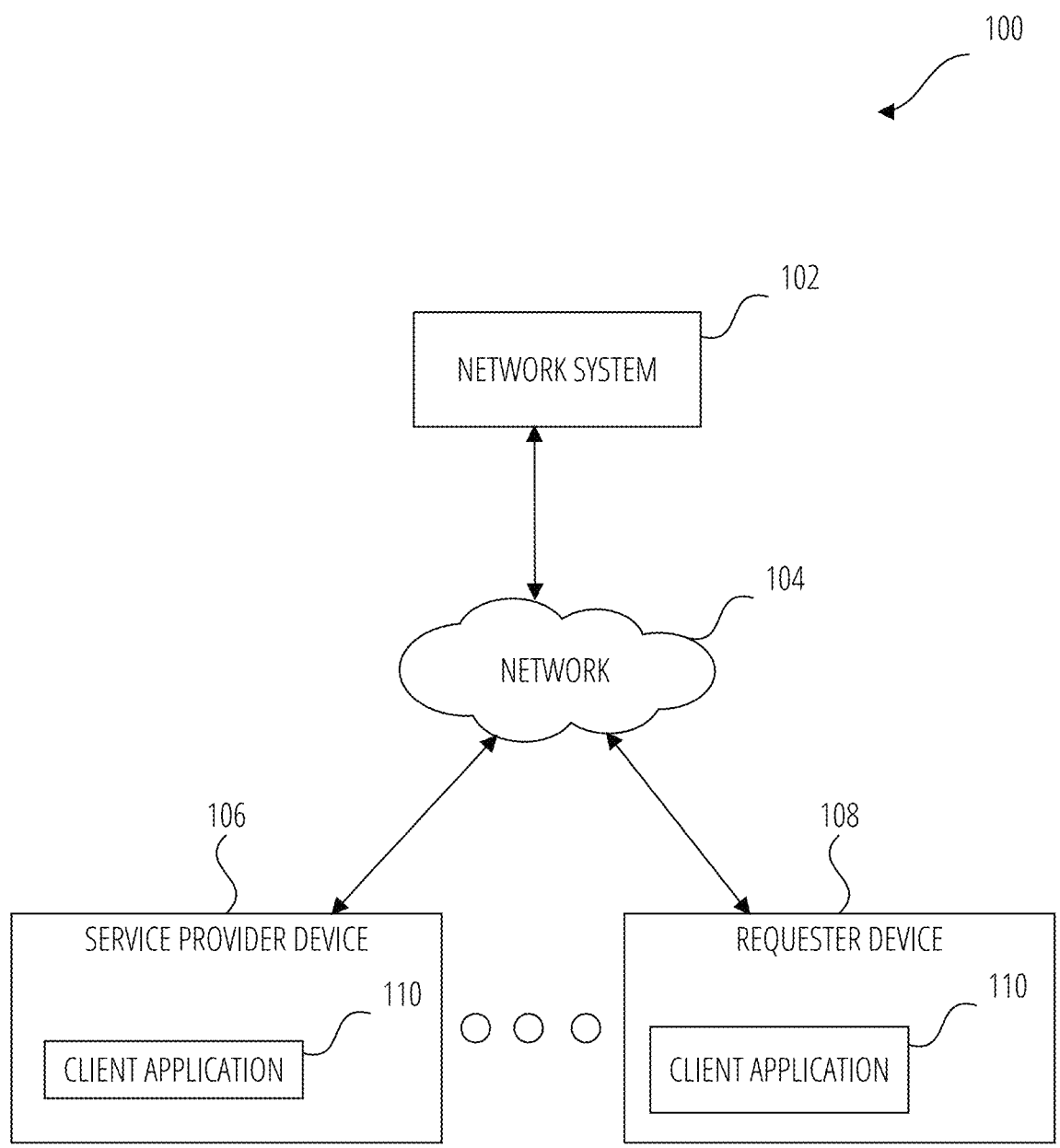
FIG. 1 is a diagram illustrating a network environment suitable for generating clickable access points and providing recommendations for pickup and drop-off locations, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for generating and providing clickable access points. Access points are popular locations or points previously selected by users of the network system that are determined based on historical data. In example embodiments, the access points are popular pickup locations that users (e.g., riders) have selected in the past when requesting transportation services.

Conventionally, existing systems only consider latitude and longitude of a target location in determining access points. Specific entrances, elevation or any vertical dimension is not taken into consideration in the systems used to generate access points. While this may be sufficient in simple cases where there is only a single entrance to a venue or location, this does not provide adequate access points for pickup and drop-off locations in large or complex environments such as airports, arenas, or malls that have multiple points of entry.

For instance, a venue may have two access points, one on the north side of the building and one on the southwest side of the building. The primary location of the venue (e.g., the latitude and longitude coordinates of the venue) may not be representative of the location of either access point. Conventional systems use the primary location of the venue, such as the latitude and longitude coordinates of the center of the venue, to determine pickup and drop-off points. This results in pickup and drop-off points that are incorrect and not optimal to either of the two access points for the venue. In contrast, example embodiments include modeling of historical user pickup points and third-party databases to determine and display specific access points for target locations.

Accordingly, in example embodiments, a network system uses machine learning to model common pickup and drop-off points around target locations to determine and generate access points associated with the target locations. In example embodiments, the plurality of access points is identified by clustering historical pickup and drop-off points using a clustering algorithm.

During runtime, the network system receives an indication that a user is initiating a request for transportation service (e.g., the user opens a transportation service application). The network system identifies a current location of the user (e.g., latitude and longitude) and receives a target location from the user (e.g., pickup or drop-off latitude and longitude). Based on the target location, the network system determines and generates possible access points for the target location. One or more highest ranked access points are presented to the user as a recommended pickup or drop-off point from which the user can select for the transportation service.

Therefore, example methods (e.g., algorithms) and example systems (e.g., special-purpose machines) are configured to generate clickable access points for use in a transportation service. The generated access points are at different locations of a same complex or venue. During runtime, the example methods and systems access the generated access points to identify a best ranked access point to recommend as a pickup or drop-off point. As such, one or more of the methodologies described herein facilitate solving the technical problem of determining and presenting accurate location information for navigation and transportation services that factors in multiple access points of the complex, venue, or location.

FIG. 1 is a diagram illustrating a network environment 100 suitable for generating and recommending popular pickup or drop-off locations or access points for a transportation service that considers multiple entry points of the venue or location, in accordance with example embodiments. The network environment 100 includes a network system 102 communicatively coupled via a network 104 to a service provider device 106 of a driver or service provider and a requester device 108 of a user or requester (e.g., rider). In example embodiments, the network system 102 comprises components that obtain, store, and analyze data received from the service provider device 106 or the requester device 108 in order to determine access points. More particularly, the network system 102 determines different access points of a multi-entry complex based on various signals received from the service provider device 106 or the requester device 108. The network system 102 also determines a recommendation of one or more potential access points during runtime. The components of the network system 102 are described in more detail in connection with FIG. 2 and may be implemented in a computer system, as described below with respect to FIG. 8

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the service provider device 106 and the requester device 108 are portable electronic devices such as smartphones, tablet devices, wearable computing devices (e.g., smartwatches), or similar devices. Alternatively, the service provider device 106 can correspond to an on-board computing system of a vehicle. The service provider device 106 and the requester device 108 each comprises one or more processors, memory, touch screen displays, wireless networking system (e.g., IEEE 802.11), cellular telephony support (e.g., LTE/GSM/UMTS/CDMA/HSDP A), and/or location determination capabilities.

The service provider device 106 and the requester device 108 interact with the network system 102 through a client application 110 stored thereon. The client application 110 allows for exchange of information with the network system 102 via user interfaces, as well as in background. For example, the client application 110 may determine and/or provide location information of the service provider device 106 and the requester device 108 (e.g., current location in latitude and longitude), barometer readings, or signal strengths (e.g., Wi-Fi and Bluetooth signal strengths) via the network 104, for analysis and storage. In example embodiments, the location information is used by the network system 102 for generating access points and determining recommendations of access points, as will be discussed in more details below.

In example embodiments, a first user (e.g., a requester or rider) operates the requester device 108 that executes the client application 110 to communicate with the network system 102 to make a request for a transportation service such as transport or delivery service (a request for the transportation service or request for a delivery service referred to collectively as a "trip"). In example embodiments, the client application 110 presents, via a user interface, a recommendation of one or more access points (e.g., for a target location of the first user (e.g., pickup or drop-off location) or an item to be picked up or dropped off) that the first user can select as his or her access point for the transportation service as part of the request.

A second user (e.g., a service provider or driver of a vehicle) operates the service provider device 106 to execute the client application 110 that communicates with the network system 102 to exchange information associated with providing the transportation service (e.g., to the first user of the requester device 108). The client application 110 presents information via a user interface to the second user of the service provider device 106, such as an invitation to provide the transportation service, navigation instructions (e.g., a route to an access point), and pickup and drop-off locations of people or items to be transported. The client application 110 also provides data to the network system 102 such as a current location (e.g., coordinates such as latitude and longitude), associated with the service provider device 106 or vehicle.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 8, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of client devices (e.g., service provider device 106, requester device 108) may be embodied within the network environment 100.

Furthermore, some components or functions of the network environment 100 may be combined or located elsewhere in the network environment 100. For example, some of the functions of the network system 102 may be embodied within other systems or devices of the network environment 100. Additionally, some of the functions of the client devices (e.g., service provider device 106, requester device 108) may be embodied within the network system 102. While only a single network system 102 is shown, alternative embodiments may contemplate having more than one network system 102 to perform server operations discussed herein for the network system 102.

Figure 2:
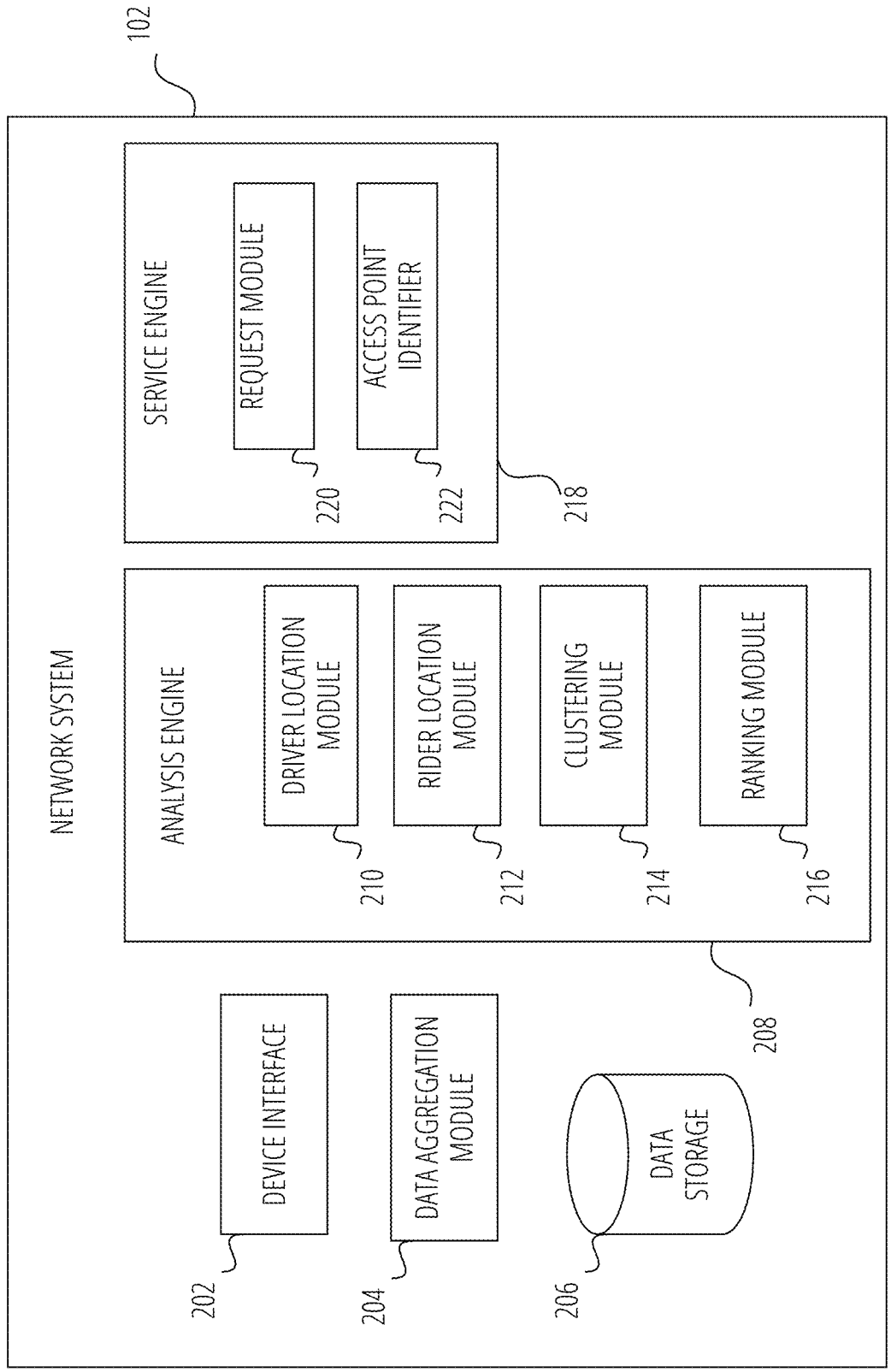
FIG. 2 is a block diagram illustrating components of the network system, according to some example embodiments.

FIG. 2 is a block diagram illustrating components of the network system 102, according to some example embodiments. In various embodiments, the network system 102 obtains and stores trip data (e.g., pickup and drop-off locations) received from the user devices (e.g., service provider device 106 and requester device 108) before, during, and after trips and analyzes the trip data to generate access points. During runtime, the network system 102 receives a target location data from a requester device 108 and uses the received data to determine one or more access points to recommend to the requester as a drop-off point for a transportation service. To enable these operations, the network system 102 comprises a device interface 202, a data aggregation module 204, a data storage 206, an analysis engine 208, and a service engine 218 all configured to communicate with each other (e.g., via a bus, shared memory, or a switch). The network system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The device interface 202 is configured to exchange data with the client devices (e.g., service provider device 106 and requester device 108) and cause presentation of the data provided by the network system 102 on the client devices, such as via a user interface displayed on the client application 110 to initiate a request for a transportation service and for display of a selectable access point. The device interface 202 also receives various trip data from the client devices and provides the trip data to the data aggregation module 204.

The data aggregation module 204 is configured to aggregate the trip data received from the client devices. The trip data can include, for example, at least one or more of: location data (e.g., latitude and longitude with timestamp), speed, times associated with each trip, or cost for the transportation service. The trip data may be received from the client device in real-time before a trip, as the user is traveling during a trip, and after a trip (e.g., providing feedback). The trip data is stored to the data storage 206 by the data aggregation module 204.

The data storage 206 is configured to store information associated with each user of the network system 102 including the aggregated trip data. The information includes various data used by the network system 102 for determining access points and providing a recommendation of one or more access points as a potential pickup or drop-off point during runtime (e.g., when the requester is making a request for transportation service). In some embodiments, the data is stored in or associated with a user profile corresponding to each user and includes a history of interactions with the network system 102 (e.g., past trip data). While the data storage 206 is shown to be embodied within the network system 102, alternative embodiments can locate the data storage 206 elsewhere and be communicatively coupled to the network system 102.

The analysis engine 208 comprises components that generate access points based on historical data. The access points comprise common pickup or drop-off points at different entry points of a complex, venue, or location. In order to generate the access points, the analysis engine 208 comprises a driver location module 210, a rider location module 212, a clustering module 214, and a ranking module 216.

The driver location module 210 determines locations based on collected or aggregated driver location estimates (e.g., latitude and longitude; horizontal location). In example embodiments, the driver location module 210 accesses the aggregated trip data for a particular area (e.g., within a predetermined distance of a particular venue or complex) to retrieve the driver location estimates for a range up to and including a time each trip begins for a large number of historical trips. In one embodiment, the range is five minutes, although any range may be used.

In example embodiments, the driver location module 210 runs a map-matching algorithm on the driver location estimates. The map-matching algorithm takes the (recorded or derived) driver location estimates (e.g., GPS data) and relates them to edges or locations in an existing graph or network (e.g., a street graph). In the present case, the driver location estimates are map-matched to a graph associated with the venue. The driver location module 210 also performs timestamp alignment between the raw and map-matched driver locations. Specifically, the driver location module 210 groups each map-matched location with a nearest raw location by timestamp.

The rider location module 212 manages rider location data. In example embodiments, the rider location module 212 accesses trip data associated with last known rider location estimates at the time the trips begin. The rider location module 212 removes all trips for which there is no recent rider location estimate (e.g., background location information is not collected from the rider) within a time threshold (e.g., 60 seconds). Additionally, the rider location module 212 removes trips for which a distance between the last known locations of the rider and the driver when the trip begins is greater than a threshold distance. In one embodiment, the threshold distance is 50 meters.

The clustering module 214 performs clustering using the remaining trip data (e.g., after the rider location module 212 removes outlier trips) to generate access points. For example, the clustering module determines a distance in between every data point (e.g., pickup and drop-off location point). The clustering module 214 clusters historical pickup and drop-off location points using a clustering algorithm, such as DBSCAN to determine access points for a location or venue. It is to be understood that any clustering technique can be used in various embodiments (e.g., K-means clustering, hierarchical clustering). The access points determined by the clustering module 214 are stored in the data storage 206. In example embodiments, the clustering may occur at any time or at predetermined times or intervals (e.g., every night, once a week), when a certain amount of trip data has been aggregated or be triggered manually by an operator of the network system 102.

The service engine 218 is configured to manage a transportation service request during runtime. Accordingly, the service engine 218 comprises a request module 220 and an access point identifier 222. The service engine 218 may comprise other components (not shown) for managing a transportation service including assigning service providers (e.g., drivers, couriers) to a transportation service request and providing routes to a destination associated with the transportation service request.

The request module 220 manages the transportation service request. In example embodiments, the request module 220 detects or receives an indication that a user is initiating a request for a transportation service at the requester device 108. For example, the request module 220 can detect that the user opens the client application 110 and initiates a request for transportation service (e.g., selects a target location to which to travel). The request module 220 receiving the request for transportation service and a current location of the requester device 108.

The access point identifier 222 generates a recommendation of one or more access points as potential pickup or drop-off points for the transportation service request. In one embodiment, the access point identifier 222 accesses a user profile to determine the user's preferences. The access point identifier 222 ranks the nearby access points for the target location based on user preferences. In some examples, the access point identifier 222 ranks access points based on a popularity metric that indicates a number of transportation trips associated with each access point. In another example, the access point identifier 222 ranks access points based on a threshold metric that indicates a minimum number of transportation service trips associated with each access point. The access point identifier 222 selects a top ranked access point (or top ranked access points) for the pickup or drop-off point recommendation.

The request module 220 provides (e.g., via the device interface 202) the recommendation of the one or more access points identified by the access point identifier 222 to the client devices (e.g., service provider device 106 and requester device 108) as pickup or drop-off point recommendations. The client application 110 may display the pickup or drop-off point recommendation as the user is requesting the transportation service. For example, the client application 110 can present the recommendations on a map, a drop-down list, or a carousel from which the user can select one of the recommended access points as the location where the trip will begin (e.g., the user will meet the service provider) or where the trip will end (e.g., where the service provider drops off the user).

A selection of an access point is then received by the request module 220 and a transportation service is established by the request module 220. Establishing the transportation service includes assigning a service provider to the transportation service and providing navigation instructions (e.g., map, turn-by-turn instructions) to the service provider device 106 to navigate to the access point.

Figure 3:
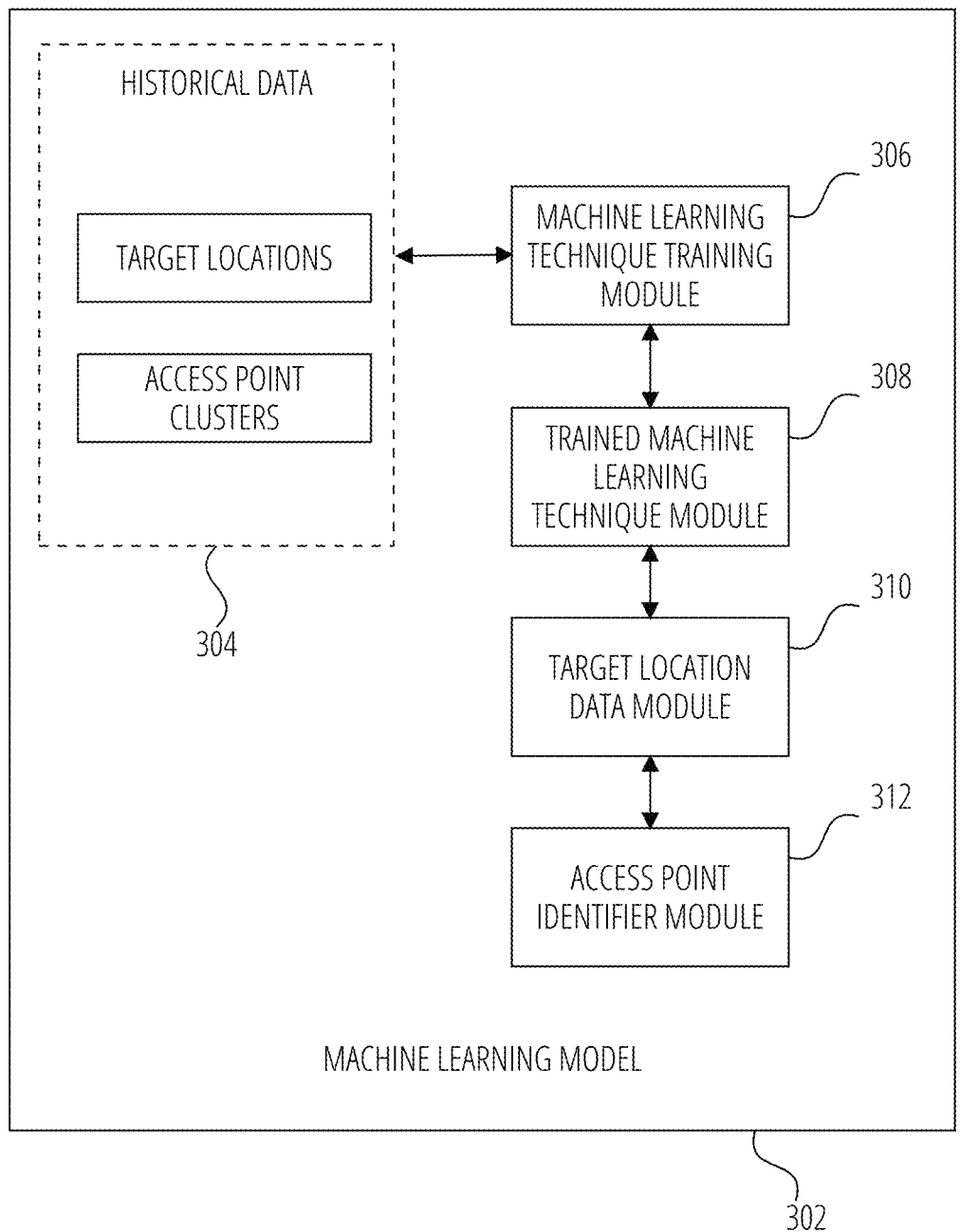
FIG. 3 illustrates a machine learning model, according to some example embodiments.

FIG. 3 illustrates a machine learning model 302, according to some example embodiments. The machine learning model 302 includes a machine learning technique training module 306, a trained machine learning technique module 308, a target location data module 310, and an access point identifier module 312. In some implementations, some modules of machine learning model 302 may be implemented in the network system 102.

The historical data 304 includes a database of target locations and access point clusters. For example, each target location (e.g., a pickup point or drop-off point) is associated with a location identification tag. Each location identification tag is further associated with a cluster of access points.

The machine learning technique training module 306 trains a machine learning model to predict one or more access points for a target location by analyzing the historical data 304. In some embodiments the network system 102 may train the machine learning technique training module 306 on a periodic basis (e.g., weekly, monthly, annually). Some example machine learning models that can be used in example embodiments include K-Means clustering and Expectation-Maximization Clustering.

Once the training data are collaged and processed, the machine learning technique training module 306 generates the trained machine learning technique model 308.

The trained machine learning technique module 308 is configured to receive a target location from the target location data module 310. For example, the target location data module 310 receives a target location data from a requester device 108 via a client application 110. The target location data module 310 instructs the trained machine learning technique module 308 to apply the trained machine learning technique to the target location data received by the target location data module 310. The trained machine learning technique module 308 provides a predicted best access point or best access points based on the target location data provided by the target location data module 310.

In some examples, the trained machine learning technique module 308 provides the predicted best access point or best access points to the access point identifier module 312. The access point identifier module 312 uses the predicted best access point or access points to provide a recommendation of one or more access points to a service provider device 16 and/or requester device 108.

Figure 4:
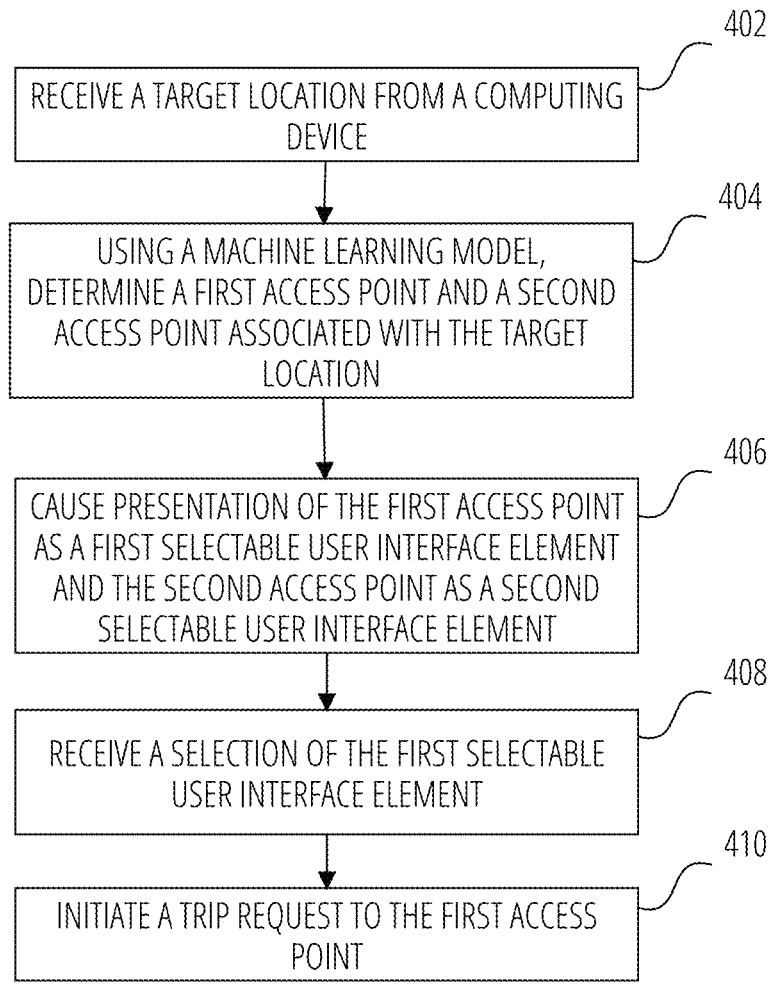
FIG. 4 is a flowchart illustrating operations of a method for generating access points and recommending a specific access point, according to some example embodiments.

FIG. 4 is a flowchart illustrating operations of a method for generating the access points and recommending a specific access point, according to some example embodiments. Operations in the method may be performed by a computing system, such as the network system 102, using components described above with respect to FIG. 2. Accordingly, the method is described by way of example with reference to the network system 102. However, it shall be appreciated that at least some of the operations of the method may be deployed on various other hardware configurations or be performed by similar components residing elsewhere in the network environment 100. Therefore, the method is not intended to be limited to the network system 102.

At operation 402, the computing system (e.g., service engine 218, request module 220) receives a target location from a computing device (e.g., service provider device 106, requester device 108). The target location may be a venue comprising a plurality of entry points. The target location comprises primary map coordinates on a geographical map. In one example the primary map coordinates are latitude and longitude coordinates of the center point of the venue or building. The computing system detects that the user opens the client application 110 and is initiating a request for transportation service by selecting a target location to which to travel. The computing system receives the request for transportation service and a current location of the computing device.

At operation 404, the computing system analyzes historical data associated with the target location using a machine learning model trained to determine a first access point and a second access point associated with the target location. In one example, historical data associated with the target location is analyzed by the machine learning model 302 to determine the first access point and the second access point, as explained above.

In some examples, the first access point and/or second access point is received via the network 104 from third party applications. For example, the analysis engine 208 may access a list of predefined access points associated with a target location via the network 104.

The first access point comprises first refined map coordinates representing a first entry point to the venue. The first refined map coordinates are different than the primary map coordinates. The second access point comprises second refined map coordinates representing a second entry point to the venue. The second refined map coordinates are different than the primary map coordinates and the first refined map coordinates.

At operation 406, the computing system (e.g., request module 220 via the device interface 202) causes presentation of the first access point as a first selectable user interface element (e.g., button, checkbox, list box, toggle field, etc.) and the second access point as a second selectable user interface element on a graphical user interface of the computing device. For example, the computing system provides the first access point and second access point to the computing device to be displayed on the graphical user interface as a first selectable user interface element and a second selectable user interface element, respectively.

At operation 408, the computing system (e.g., request module 220 via the device interface 202) receives a selection of the first selectable user interface element. At operation 410, in response to receiving the selection, the computing system initiates a trip request to the first access point. For example, the trip request may be for a transportation trip as discussed above.

In some examples, the computing system generates a cost estimate and a travel time estimate based on the refined map coordinates of the first access point. In one example the computing system causes presentation of the cost estimate and travel time on the graphical user interface of the computing device.

The computing system (e.g., via analysis engine 208) may determine a preliminary cost estimate and a preliminary travel time estimate for the target location. For example, the analysis engine 208 retrieves the current location of the user via the rider location module 212 and determines a preliminary cost estimate and a preliminary travel time estimate for a trip from the current location to the target location. The preliminary cost estimate may be determined by accessing data (e.g., in data storage 206) that indicate the costs per distance (e.g., dollars per mile) to travel within a given geographic area. The preliminary travel time estimate may be determined using GPS data received by the computing device and traffic data received by one or more third party applications.

In some examples, a final cost estimate and final travel time estimate are generated using the data aggregation module 204. The data aggregation module 204 aggregates trip data. The trip data can include, for example, location data (e.g., latitude and longitude with timestamp), speed, times associated with each trip, and/or feedback for the transportation service. The trip data may be received from the client devices in real-time before a trip, during the trip, and/or after the trip. The data aggregation module 204 stores the trip data to the data storage 206.

In some examples, the computing system transmits instructions to a second computing device (e.g., service provider device 106) to begin navigating to the first refined map coordinates.

In some examples, the computing system (e.g., access point identifier 222) generates a ranked list comprising the first access point and the second access point. For example, the access point identifier 222 ranks the access points based on the distance from the computing device's current location to each access point.

In some examples, the computing system ranks the access points based on a popularity metric that indicates a number of transportation trips associated with each of the first access point and second access point. For example, if the historical data 304 indicates that the first access point has been used for 2000 trips and the second access point has been used for 1000 trips, then the access point identifier 222 ranks the first access point above the second access point.

In some examples, the computing system ranks the access point based on a threshold metric that indicates a minimum number of transportation trips associated with each of the first access point and second access point. For example, if an access point has under 20 trips associated with it, the computing system will rank that access point low on a ranked list. Alternatively, if an access point has under the minimum number of transportation trips associated with it, the computing system may exclude it from the ranked list.

The computing device (e.g., request module 220 via the device interface 202) causes presentation, in order, of the first access point as the first selectable user interface element and the second access point as a second selectable user interface element on the graphical user interface of the computing device. For example, the computing system provides the first access point and the second access point to the computing device to be displayed on the graphical user interface as the first selectable user interface element and the second selectable user interface element, respectively. In some examples, the first selectable user interface element and the second selectable user interface element are displayed within a scrollable carousel on the graphical user interface of the computing device.

In some examples, the first selectable user interface element and the second selectable user interface element are displayed in ranked order (e.g., highest ranked displayed first) based on the ranked list.

In some examples, the computing system receives location data indicating a new access point from the computing device. The data may include a third set of map coordinates indicating the location of the new access point. The computing system generates a new entry in an access point database representing the new access point. In one example, the third access point is displayed as a third selectable user interface element within the graphical user interface of the computing device. A user may input the location data indicating the new access point. The computing device detects the input indicating the new access point and sends information relating to the new access point to the computer system. The computer system receives the information and generates the new entry in the access point database representing the new access point. The computer system provides information back to the computing device or a computing device of a transportation provider, to be displayed on the computing device.

Figure 5:
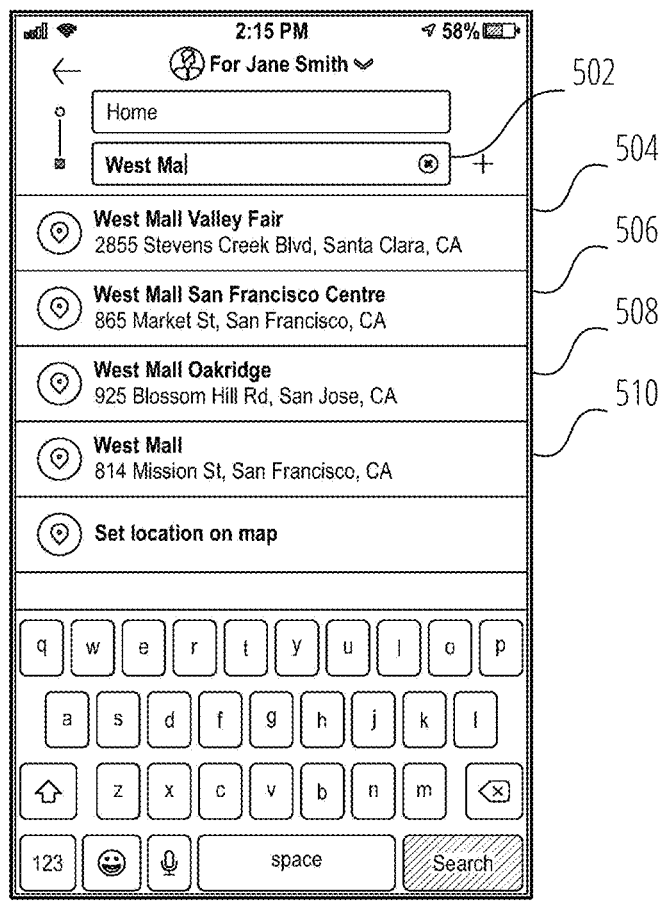
FIG. 5 is an illustration of a graphical user interface of a transportation service application, according to some example embodiments.

FIG. 5 is an illustration of a graphical user interface of a transportation service application displayed on a computing device (e.g., requester device 108), according to some example embodiments. In some examples, a user may input a target location 502 in the graphical user interface at input field 502. The computing device or computing system provides a list of suggested target locations (e.g., 504, 506, 508, 510) based on the input target location.

Figure 6:
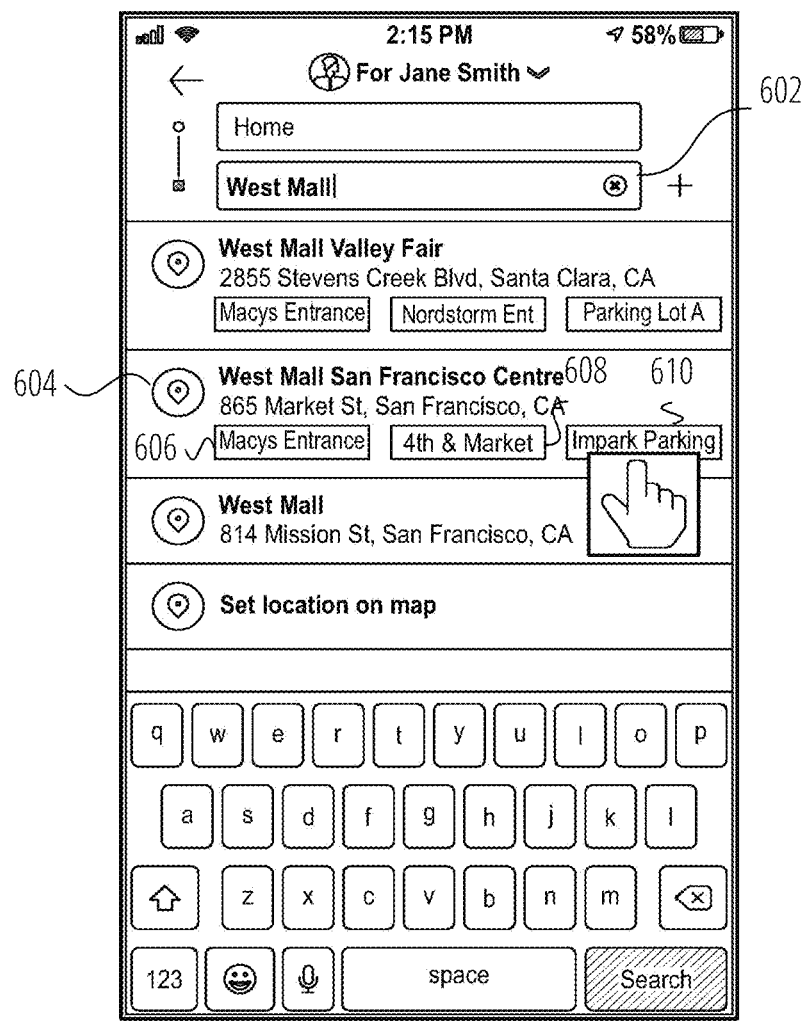
FIG. 6 is an illustration of a graphical user interface of a transportation service application, according to some example embodiments.

FIG. 6 is an illustration of a graphical user interface of a transportation service application displayed on a computing device, according to some example embodiments. In some examples, a user may input a target location 602 in the graphical user interface. The computing system or computing device provides one or more suggested target locations that include one or more suggested access points. For example, the computing device provides a suggested target location 604 and access points 606, 608, and 610. The access points 606, 608, 610 each represent a different entry point to the target location. A user may select an access point by selecting the selectable user interface element representing the access point. The computing device detects the selection of the selectable user interface element representing the access point and sends information related to the selection to the computing system. The computing system receives the information, and performs further processing (e.g., modifying the cost estimate and/or the travel time estimate based on the refined map coordinates of the first access point or selection of a transportation service provider based on the selected user interface element representing the access point, etc.) and provides the relevant data to the computing device or a computing device of a transportation provider to be displayed on the computing device.

Figure 7:
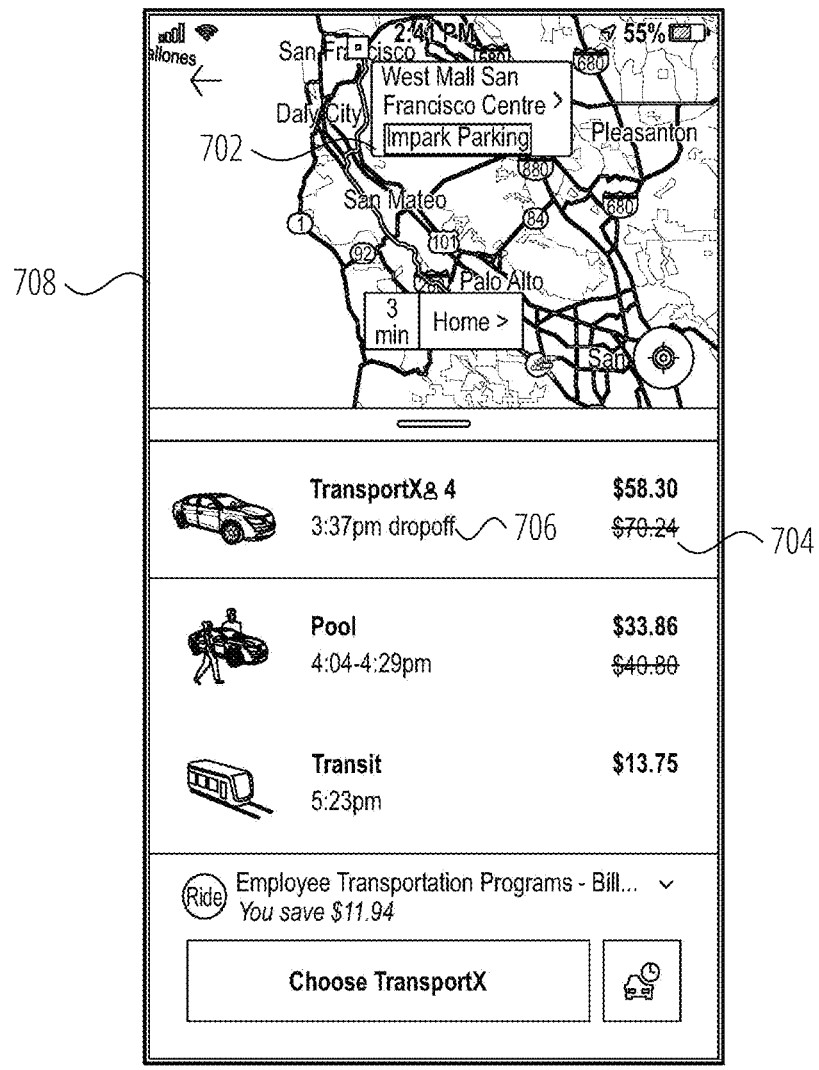
FIG. 7 is an illustration of a graphical user interface of a transportation service application, according to some example embodiments.

FIG. 7 is an illustration of a graphical user interface of a transportation service application displayed on a computing device, according to some example embodiments. After a user has selected an access point 702, the service engine 218 determines a modified cost 704 and modified travel time 706 to the selected access point. The transportation service application may further include a map display 708 depicting the current location and the target location.

Figure 8:
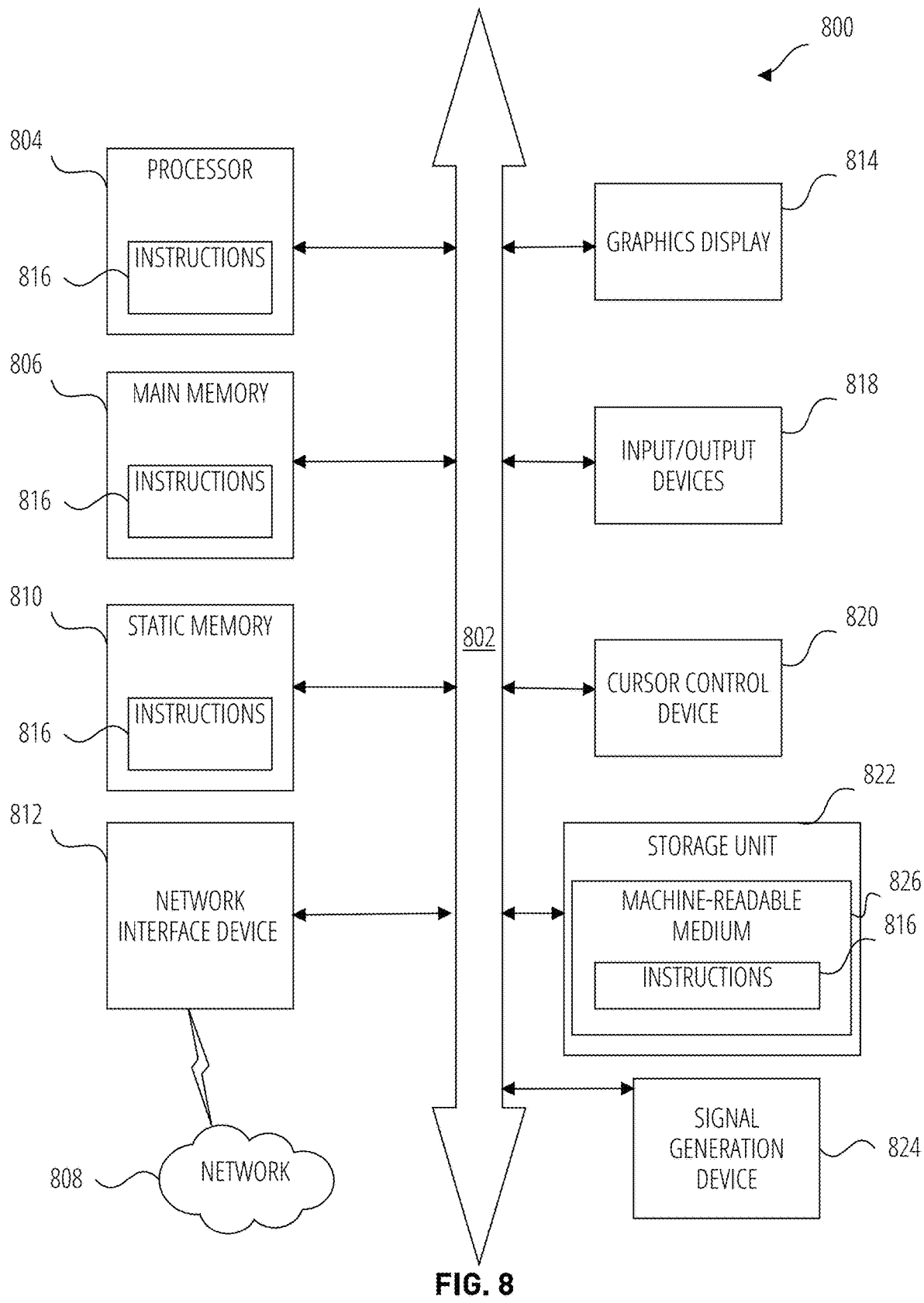
FIG. 8 is a diagrammatic representation of a machine, according to some example embodiments.

FIG. 8 shows a diagrammatic representation of a machine in the example form of a machine 800 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 800 includes a processor 804 (e.g., a central processing unit (CPU) a graphics processing unit (GPU) or both), a main memory 806 and a static memory 810 (with one or more sets of instructions 816) which communicate with each other via a bus 802. The machine 8000 may further include a graphics display 814 (e.g., a liquid crystal display (LCD) or a cathode ray tube (CRT)). The machine 800 also includes an alphanumeric input device 818 (e.g., a keyboard), a cursor control device 820 (e.g., a mouse), a disk storage unit 822, a signal generation device 824 (e.g., a speaker) and a network interface device 812.

The disk storage unit 822 includes a non-transitory computer-readable medium (e.g., machine-readable medium 826) on which is stored one or more sets of instructions 816 (e.g., software) embodying any one or more of the methodologies or functions described herein. The instructions 816 may also reside, completely or at least partially, within the main memory 806 and/or within the processor 804 during execution thereof by the computer system 400, the main memory 806 and the processor 804 also constituting non-transitory computer-readable media.

The instructions 816 may further be transmitted or received over a network 104 via the network interface device 812.

While not illustrated, it is understood that that machine 800 can further include sensors that create data regarding a thermal state of the machine 800, an orientation of the machine 800 and a current location of the machine 800. In various embodiments, the machine 800 includes a temperature sensor, an accelerometer and/or a global position system for identifying the current location of the machine 800.

While the non-transitory computer-readable medium, machine-readable medium 826 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the subject matter described herein. The term "computer-readable medium" shall accordingly be taken to include, but not be limited to, solid-state memories, optical and magnetic media, and carrier wave signals.

Thus, a method(s) and system(s) to detect a thermal state(s) and position(s) of a computing device are disclosed herein in accordance with various embodiments. Although the subject matter herein has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. A method comprising:
  receiving a target location from a computing device, the target location comprising primary map coordinates on a geographical map;
  analyzing historical user data associated with the target location using a machine learning model trained to perform operations comprising:
    determining a first access point associated with the target location the first access point comprising first refined map coordinates, the first refined map coordinates being different from the primary map coordinates, and determining a second access point associated with the target location, the second access point comprising second refined map coordinates, the second refined map coordinates being different from the primary map coordinates and the first refined map coordinates;

determining that a size of a set of transportation data associated with the second access point is below a threshold size;

in response to the determination, causing presentation of the first access point as a first selectable user interface element on a graphical user interface of the computing device;

receiving a first selection of the first selectable user interface element from the computing device; and in response to receiving the first selection, initiating a trip request to the first access point.

2. The method of claim 1, further comprising:
generating a final cost estimate and a final travel time estimate based on the access point map coordinates of the first access point; and
causing display of the final cost estimate and the final travel time on the graphical user interface of the computing device.

3. The method of claim 1, wherein the first access point is one entry point of target location.

4. The method of claim 2, further comprising:
transmitting instructions to a second computing device to begin navigating to the access point map coordinates.

5. The method of claim 1, wherein the first access point is exclusively represented as a single selectable user interface element.

6. The method of claim 1, wherein the selectable user interface element is presented within a carousel on the graphical user interface of the computing device.

7. The method of claim 1, further comprising:
receiving location data from the computing device indicating a new access point;
generating a new entry in an access point database, the new entry representing the new access point; and
causing presentation of the new access point as a second selectable user interface element within the graphical user interface of the computing device.

8. A system comprising:
a processor; and
a memory storing instructions that, when executed by the processor, configure the system to perform operations comprising:
receiving a target location from a computing device, the target location comprising primary map coordinates on a geographical map;
analyzing historical user data associated with the target location using a machine learning model trained to perform operations comprising:
determining a first access point associated with the target location the first access point comprising first refined map coordinates, the first refined map coordinates being different from the primary map coordinates, and
determining a second access point associated with the target location, the second access point comprising second refined map coordinates, the second refined map coordinates being different from the primary map coordinates and the first refined map coordinates;
determining that a size of a set of transportation data associated with the second access point is below a threshold size;
in response to the determination, causing presentation of the first access point as a first selectable user interface element on a graphical user interface of the computing device;
receiving a first selection of the first selectable user interface element from the computing device; and
in response to receiving the first selection, initiating a trip request to the first access point.

9. The system of claim 8, wherein the target location is a venue comprising a plurality of entry points.

10. The system of claim 9, wherein the selected access point is an entry point from the plurality of entry points.

11. The system of claim 8, wherein the operations further comprise:
transmitting instructions to a second computing device to begin navigating to the access point map coordinates of the selected access point.

12. The system of claim 8, wherein the first access point is exclusively represented as a single selectable user interface element.

13. The system of claim 8, wherein the selectable user interface element is presented within a scrollable carousel on the graphical user interface of the computing device.

14. The system of claim 8, further comprising:
receiving location data from the computing device indicating a new access point;
generating a new entry in an access point database, the new entry representing the new access point; and
causing presentation of the new access point as a second selectable user interface element within the graphical user interface of the computing device.

15. The system of claim 8, further comprising:
receiving location data from the computing device indicating a new access point;
generating a new entry in an access point database, the new entry representing the new access point; and
causing presentation of the new access point as a second selectable user interface element within the graphical user interface of the computing device.

16. A non-transitory computer-readable storage medium, the computer-readable storage medium including instructions that when executed by a computer, cause the computer to perform operations comprising:
receiving a target location from a computing device, the target location comprising primary map coordinates on a geographical map;
analyzing historical user data associated with the target location using a machine learning model trained to perform operations comprising:
determining a first access point associated with the target location the first access point comprising first refined map coordinates, the first refined map coordinates being different from the primary map coordinates, and
determining a second access point associated with the target location, the second access point comprising second refined map coordinates, the second refined map coordinates being different from the primary map coordinates and the first refined map coordinates;

determining that a size of a set of transportation data associated with the second access point is below a threshold size;
in response to the determination, causing presentation of the first access point as a first selectable user interface element on a graphical user interface of the computing device;
receiving a first selection of the first selectable user interface element from the computing device; and
in response to receiving the first selection, initiating a trip request to the first access point.

17. The computer-readable storage medium of claim 16, wherein the target location is a venue comprising a plurality of entry points.

18. The computer-readable storage medium of claim 16, further comprising:
generating a final cost estimate and a final travel time estimate based on the access point map coordinates of the first access point; and
causing display of the final cost estimate and the final travel time on the graphical user interface of the computing device.

19. The computer-readable storage medium of claim 16, wherein the first access point is one entry point of target location.

20. The computer-readable storage medium of claim 16, wherein the selectable user interface element is presented within a carousel on the graphical user interface of the computing device.

* * * * *